Sept. 28, 1954 L. J. MOULTON 2,690,167
DUAL FUEL ENGINE CONTROL SYSTEM
Filed April 6, 1951 4 Sheets-Sheet 1

INVENTOR.
L.J. MOULTON
BY
ATTORNEY

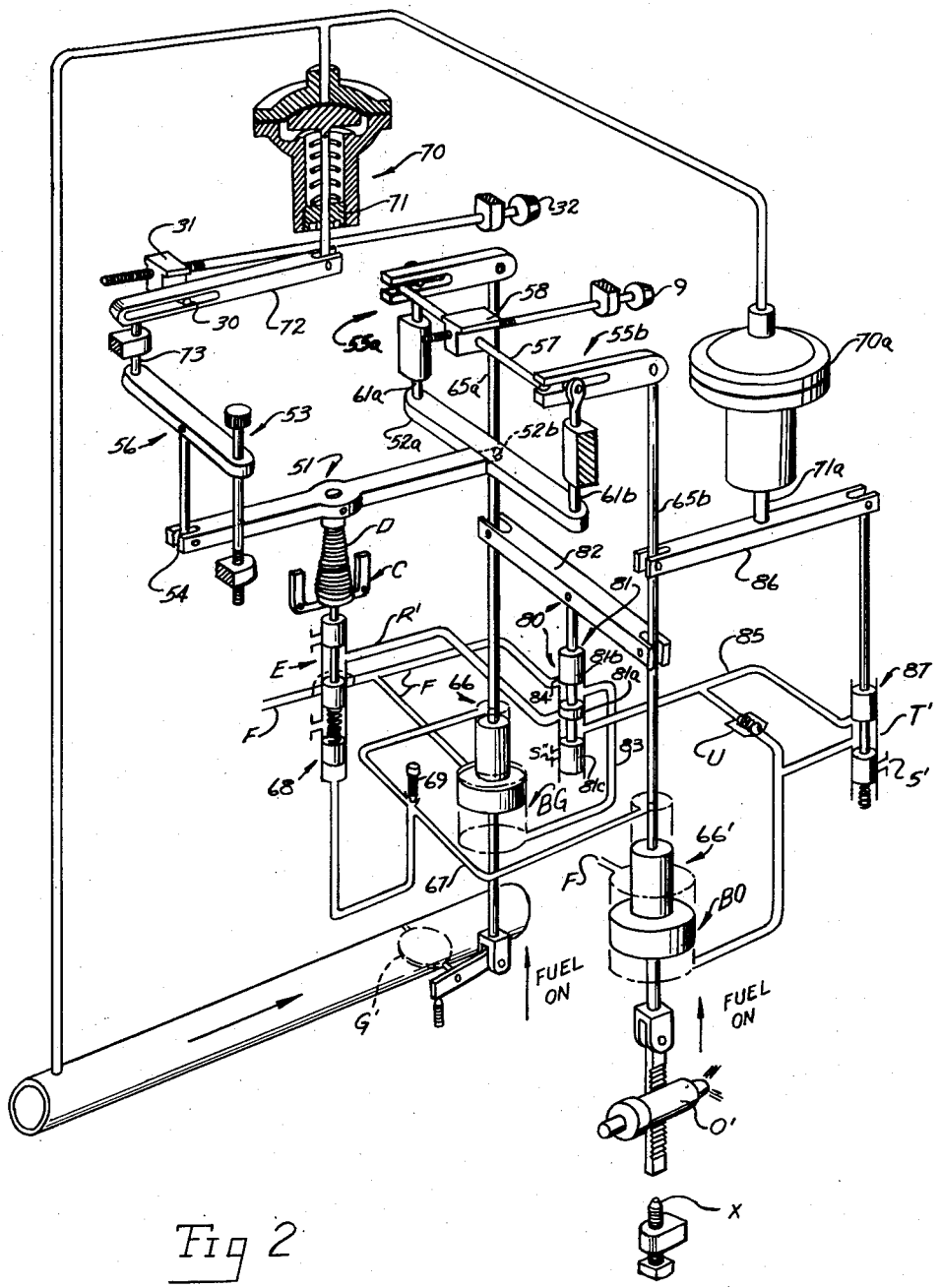

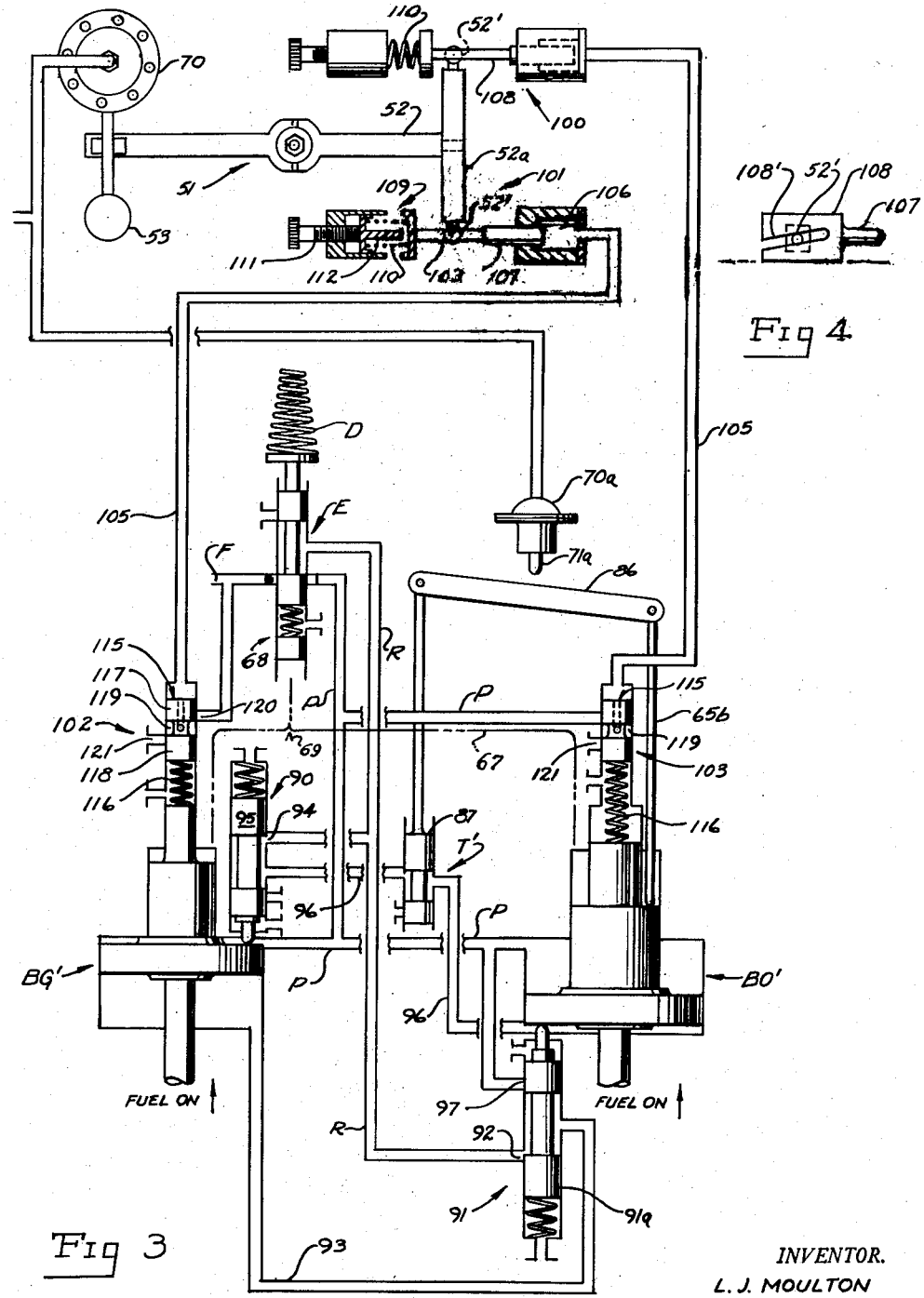

Sept. 28, 1954  L. J. MOULTON  2,690,167
DUAL FUEL ENGINE CONTROL SYSTEM
Filed April 6, 1951  4 Sheets-Sheet 4

INVENTOR.
L. J. MOULTON
BY
ATTORNEY

Patented Sept. 28, 1954

2,690,167

UNITED STATES PATENT OFFICE 2,690,167

DUAL FUEL ENGINE CONTROL SYSTEM

Lloyd Jackson Moulton, Mentor, Ohio, assignor to The Marquette Metal Products Company, Cleveland, Ohio Application April 6, 1951, Serial No. 219,686

23 Claims. (Cl. 123—27)

1

The expanding use and application of dual fuel engines presents several problems in respect to providing for safe dependable unattended operation with automatic conversion from one fuel to the other by or in conjunction with the engine governor apparatus.

Dual fuel engines of the compression-ignition type, employ injected fuel oil for ignition (pilot charge), and either gas or fuel oil is added to the pilot oil charge to carry the required operating load. In areas where gas is available in quantity and is economical, it is customary to maintain the operating load principally through use of gas. In event the gas supply becomes inadequate the operating load is carried either by supplementing the gas supply with fuel oil or by completely substituting oil for gas.

Governor controlled, dual fuel engines carry many types of loads. These include D. C. generators, pumps, compressors, and A. C. generators (both singly and when connected in network systems). In all those services, indicating one object of the present invention, it is desirable that conversion from gas to oil, and vice versa (hereinafter usually fuel conversion) be accomplished automatically through operation of the governor apparatus without possibility of overloading the engines and in a manner enabling the engine to carry the operating load during fuel conversions at an unchanged speed.

To prevent the engine from becoming overloaded when it is capable of being supplied with two fuels, each normally of a quantity adequate to carry full load, it is desirable (indicating another object of the invention) automatically to control or limit the supplying of a second fuel except when the first fuel has failed and then (a) only in proportion to the amount of failure of the first fuel, and (b) only so long as the first fuel continues to fail. As a correlated object the invention aims to make possible the utilization of all the available gas in event of a partial gas failure before supplementing the gas with oil to carry the operating load.

When governor controlled dual fuel engines are coupled together mechanically to a common output or are connected to an A. C. network system, a partial and usually even a complete failure of gas to one only of such engines will not result in a sufficient speed change of the group or network to allow the inadequately gas-supplied engine through governor action to take advantage of its automatic ability to convert to fuel oil operation. To insure automatic conversion without speed change due thereto and the continua-

2 tion of normal load-carrying by the inadequately gas-supplied engine and at the same time to insure using all available gas (indicating still another object hereof), an automatic re-adjustment of the governor speed setting is effected as a function of the amount of gas failure.

The normal operation of subject governing system in an A. C. network is similar to the governor operation for other previously mentioned types of loads except in respect to the operation that results as a gas failure occurs on one engine or one or more engines supplying a small portion of the network input. Under these conditions, assuming the balance of the network is capable of carrying the deficiency caused by the gas failure, the network frequency and therefore engine speed will probably remain substantially constant. Thus to enable a change of servo mechanism position and the carrying by the gas-failure-affected engine of its normal proportionate share of the network load with the remaining available gas (and/or fuel oil), it is necessary to reset the speed of the engine experiencing gas failure. For example if the subject governor mechanism were set for 4% speed droop (corresponding to the network droop) a 50% failure of gas would reset the governor speed 2% assuming the engine was carrying 50% load on gas prior to the failure. With the servo mechanism in mid gas travel, the reset speed could cause the servo mechanism to go to full gas position and thus use all available gas and continue carrying 50% load at the network frequency. If full load was carried prior to gas failure and the above failure and speed resetting occurred, the servo mechanism would be positioned to 50% fuel oil and full load would continue to be carried using the available gas and 50% oil.

Gas-failure-responsive load limiting operates in the already outlined normal manner in an A. C. network system.

Normally the above noted objectives can be achieved as a result of the failure of gas pressure. In certain special installations where the B. t. u. content of the gas varies over a wide range or does not remain approximately proportional to supply pressure, it is desirable to make the load limiting and speed resetting operations functions of B. t. u. content. That is possible with the present invention indicating a still further object. The requirement may be met, for example, by converting the readings of a commercial calorimeter of the continuous type into an air pressure signal that is applied in a manner to control or modify the load limiting and speed resetting devices hereof as will be made clear.

The normal governing system for a dual fuel engine adjusted for example to 4% speed droop would cause the engine to operate at 100% speed at no load (the "set" speed). Application of half load would cause a drop to 98% speed and full load to 96% speed, assuming that gas is available to carry full load. If a failure of gas occurs and oil is required to carry full load, then a drop to 92% speed would ordinarily occur. Full load speed, fuel oil operation may be restored to full load speed, gas operation, i. e. 96% speed, by readjusting the governor speed setting. If the engine were now unloaded, the speed would rise to 100% speed as is desirable. However, if gas is restored and the engine remains unloaded, the speed would rise to 104%. 100% speed at no load gas operation may be restored by again adjusting the governor speed setting. Thus for a complete gas failure a 4% increase speed setting readjustment is required in order to maintain the speed prevailing prior to the gas failure. In the event of a 50% gas failure while the engine is carrying full load and oil is then available to supplement the inadequate gas supply, a drop to 94% speed will occur. Here a 2% increase speed setting readjustment is necessary in order to maintain full load at the speed formerly maintained by gas alone (full load gas operating speed).

Thus it is established that if the amount of speed setting readjustment is proportional to the amount of gas failure, then fuel oil operating speed for any engine load will correspond approximately to gas operating speed for that load.

In the fuel systems of dual fuel engines it is important in order to prevent overload of the engines to restrain delivery of fuel oil in excess of pilot oil until occurrence of a gas failure. If a 100% gas failure occurs then conversion to 100% fuel oil operation is necessary. A 50% gas failure requires limiting the fuel oil supplied to approximately 50% of fuel oil delivery capacity. If the amount of load limiting for oil operation allows oil delivery to be proportional to gas pressure failure, then engine loading will be limited to its rated or safe output value.

The speed resetting operations necessary to meet practical engine control requirements under conditions such as discussed above can usually be done manually at least in single engine unit operator-attended installations, but even in those it is difficult to coordinate speed resetting and load limit adjustments particularly in event of sudden load changes during or immediately following fuel conversions. Other disturbing factors are suddenness and unexpectedness of gas failures and the occasional temporary nature of the failure. Those call for high degrees of vigilance or skill. As the number of engine units per installation is increased, the difficulties involved in making the necessary readjustments manually in time to prevent disruption or derangement of power output as a result of sudden changes in gas supply or to prevent overloading as a result of sudden power demands increase beyond reasonably expectable capabilities of attendant personnel. A further object of the present invention is to provide mechanism for coordinately effecting the necessary speed setting and load limit adjustment corrections automatically as a function of fuel supply abnormalities e. g. gas supply pressure variations. Dual fuel automatic control through engine governor equipment as outlined above can be effected by a variety of specifically different arrangements, the following examples being shown by way of illustration:

Fig. 2 is a schematic perspective view showing a single hydraulic relay type governor including separate servo pistons for the two fuels and interlocking means to insure appropriate sequential operation of the pistons.

Fig. 3 is a schematic diagram showing a modification of the Fig. 2 apparatus, Fig. 4 being a detail view explanatory of Fig. 3.

Figure 1:
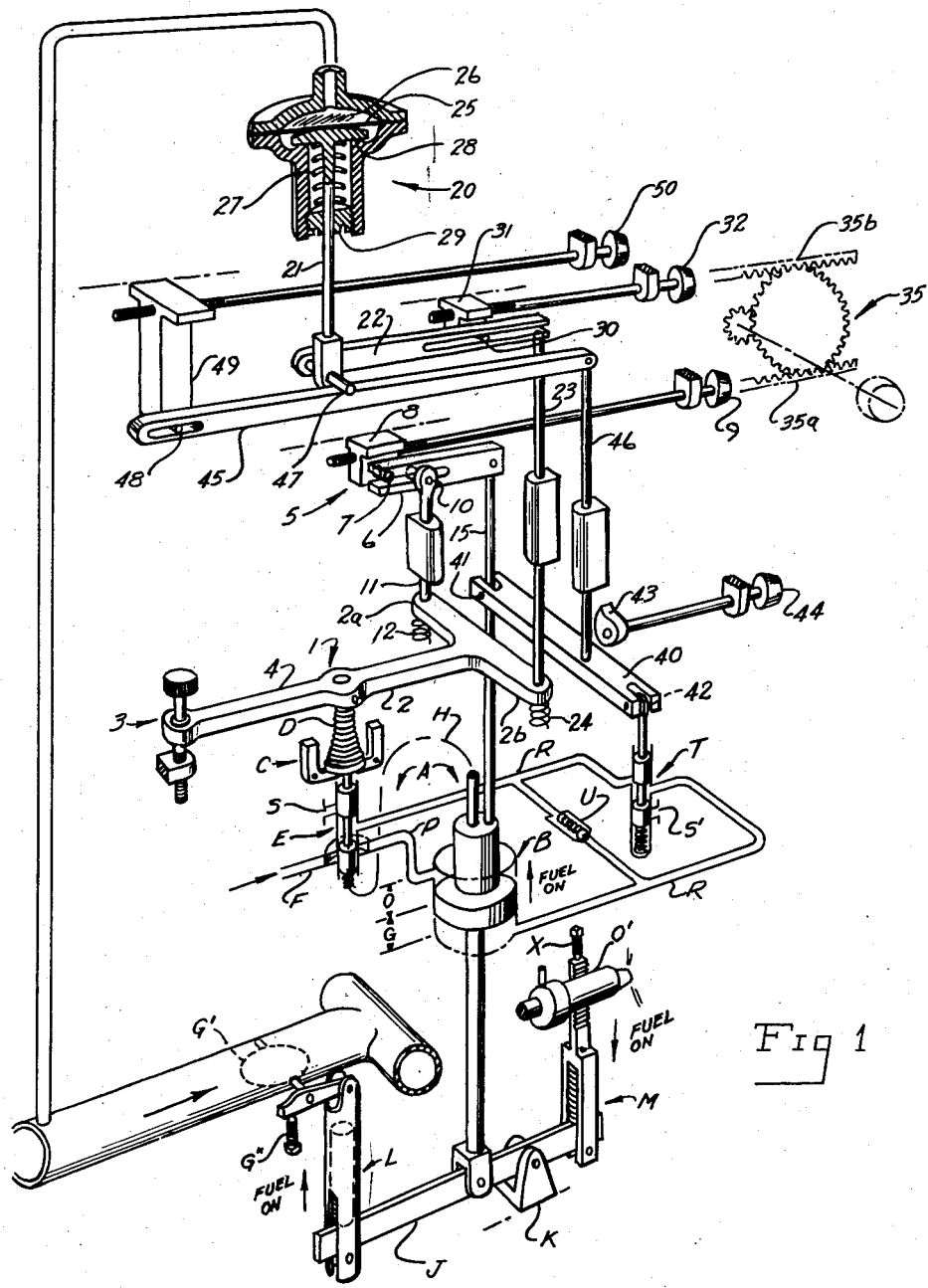
Fig. 1 is a schematic perspective view showing a dual fuel engine governor of the hydraulic relay type having a single fuel metering mechanism operating to supply both fuels to the engine.

The typical governor arrangement A according to Fig. 1 has the power piston B of its servo mechanism adjusted for fuel metering in response to speed change detection by fly balls C and speeder spring D. The flyballs are suitably driven by or in synchronism with the engine and cooperate with the speeder spring to move the pilot valve E of the servo mechanism. The pilot valve of the illustrated governor controls constant pressure fluid from a source F to cause "fuel on" and "fuel off" movements of the power piston as fully disclosed in A. Kalin Patent 2,219,229, October 22, 1940.

For isochronous operation, when that is desired, as for pace-setting in A. C. networks, the governor has an automatic fluid-operated feed back or "compensating" (temporary speed droop) mechanism representing herein largely by broken line H. The governor as arranged for dual fuel control in accordance with the present invention would not necessarily require such compensating means.

In the operation of the governor, constant fluid pressure through line P is always maintained against a relatively small area (top) of the servo piston, tending to move the piston in the "fuel-off" direction. With the pilot valve E in neutral position fluid from the source is trapped as in a fluid line R ("regulating" fluid) against the relatively larger area (bottom) side of the piston. Thus downward movement of the pilot valve admits regulating fluid to the servo piston for "fuel-on" movement thereof and upward movement of the pilot valve spills fluid at S to cause downward, "fuel-off," movement. The operation of spilling fluid from line R to S', as by a valve T (described later), can be used for shutdown or as contemplated hereby, for load limiting as a function of servo piston position. Valve T usually requires a one way by-pass valve U to enable the governor pilot valve always to be capable of reducing fuel.

A first portion of the servo piston stroke as indicated on Fig. 1 at G (gas range) meters the gaseous fuel by opening or closing a suitable gas valve G' at the inlet of the engine manifold, the piston acting, for example, through a linkage mechanism including a lever J having a fixed pivot K. Indicated portion O of the servo piston stroke (oil range) meters the diesel fuel oil as by connection through the same linkage to the racks of a set of injector pumps, one indicated at O'.

To enable pilot injection for ignition purposes, the fuel racks are normally blocked against "fuel off" movement to no-fuel position as by a stop X. The lever J acts through a yieldable push-rod or coupling arrangement L on the gas valve G' in the fuel-on direction of movement of the servo piston for increase feeding of gas to the engine; and, when the valve G' has been opened to a suitable stop G'', further movement of the lever causes fuel rack movement for diesel operation through another coupling M arranged for yieldable lost motion connection with the rack mechanism such that servo piston movement through gas-metering portion in range G has no effect on the fuel injectors. The servo piston B is shown at the end of its gas metering stroke portion (full fuel), the engine being assumed to be thereby adjusted for full load operation on gas.

Speed setting means for the governor is represented in Fig. 1 (in part) by a floating lever 1 acting on the speeder spring D. Assuming arm portion 2 of the lever has means temporarily forming a fixed fulcrum for it, the desired no-load or "set" speed is obtained as usual by means such as represented by manual adjuster 3 acting on arm portion 4 of the lever.

The mechanism hereof acts for automatic speed setting readjustment both for engine stabilization purposes and for fuel conversion (speed reset) on the portion 2 of lever 1. In the particular form shown the lever portion 2 has two arms 2a and 2b through which the two different speed-setting-modifying actions are independently performed in respect to the speeder spring. An "evener" type lever (not shown) can be substituted for the rigid arms 2a and 2b, in which case such lever would have a single output point of connection with the speeder lever along its longitudinal axis.

Mechanism 5 acts on lever arm 2a of speeder lever 1 and is in effect a conventional permanent speed droop mechanism. A slotted lever 6 of said mechanism, as shown, has a normally fixed fulcrum in the form of a pin 7 on a slide block 8. The position of the pin 7 can be adjusted along the slot as by a knob 9 toward and away from the point 10 of pivotal connection of a link 11 with the lever 6. Movement of the link 11 in the increase-speed-setting direction is opposed by a return spring 12 (shown as acting on arm 2a). The end of the speed droop lever 6 opposite its slot is connected for movement by the servo piston as through a link or piston tail-rod 15. As load is imposed on or is removed from the engine and the governor, through the servo piston, gives the engine added or reduced fuel the initial setting of speeder spring D is modified in accordance with the adjusted position of pin 7 and the distance the servo piston moves. That is essentially the usual permanent speed droop action in hydraulic speed governors.

The speed droop mechanism is designed to effect substantially the same amount of speed setting modification through the entire gas operating range (servo movement G) as it does through the maximum stroke fuel oil range (movement O). If the governor is called upon for isochronous operation (stability then enabled by mechanism H) the pin 7 is set into alignment with pivot 10.

As already outlined, conversion from gaseous fuel to oil requires a readjustment of the speed setting in order to maintain operation under load when the unit speed has been fixed by the character of the installation (e. g. A. C. network). The speed must be reset by an amount equal to the droop that has taken place as a result of servo movement through the gas range G.

The gas pressure failure and reestablishment i. e. return toward normal pressure after failure, make the necessary corrections in speed setting through gas-pressure-sensitive motor mechanism 20. The motor acts through a rod or link 21 on a lever 22, and the lever in turn acts on a rod 23 connected to arm 2b of the floating lever 1. A return spring 24 is provided similar to spring 12.

Motor 20, as shown, includes a flexible diaphragm 25 in a suitable case which provides a chamber 26 for connection with the gas pressure regulated region of the engine gas supply. The diaphragm at minimum engine operating or zero gas supply pressure, is forced toward the inlet side of the chamber by a spring 27 acting on a head portion of rod 21 which is shown as resting on a suitable stop shoulder 28. Since the gas pressure is usually supplied to the engine by suitable regulating means (not shown) it is advisable to provide for adjusting the force of diaphragm reactance spring 27, as by an annular threaded spring perch 29 in the motor casing, in order to make the diaphragm motion with the regulated gas pressure.

Adjusting means for the speed resetting value of the fixed stroke of motor 20 is shown in the form of a normally fixed fulcrum pin 30 movable along a slot in lever 22 and supported on a slide block 31 connected to an adjusting knob 32.

The fulcrum pin 30, in operation, is adjusted so that when the gas pressure drops to the predetermined minimum and the engine then has to commence operation solely on diesel oil the no-load, fuel oil operating speed will be the same as the no-load gas operating speed and, concomitantly, the full-load operating speeds for both fuels will be the same.

The above described arrangement necessarily results in the proper partial resetting of speed to meet the situation presented by any partial gas failure because, for example, when the gas pressure falls to 50% of its regulated value while the engine is carrying full load the governor servo piston will have moved approximately half way through its oil range O in order to maintain operating speed with only half enough gas wherefore the speed droop mechanism 5 will have permitted the same lift on speeder lever arm portion 2a (slacking action on speeder spring) as the repositioned diaphragm 25 will have, through its linkage and spring 27, depressed the speeder lever arm 2b. The two motions cancel each other.

Since the required amount of gas-pressure-responsive speed resetting is always equal to the amount of speed resetting resulting from a particular speed droop adjustment, it is feasible and under some conditions desirable to provide a single adjustment which simultaneously relocates pivot pin 30 correctly for each desired speed droop adjustment of pivot pin 7. A common knob and rack mechanism adjusting device for simultaneously locating the above mentioned pivots is diagrammatically indicated at 35. The racks 35a and 35b would be suitably connected directly to the slide blocks 8 and 31 respectively.

As earlier mentioned herein, the valve T, acting as a governor servo emergency fluid dump or spill valve is a convenient device for enabling stoppage of governor servo piston movement (piston B) in the "fuel on" direction at any point at which the engine load commences to become excessive. As shown by Fig. 1, servo piston motion is communicated to the operating stem of valve T through a lever 40 connected as at 41 to the tailrod 15 and as at 42 to the stem of the valve T. To render the lever 40 effective to open the dump valve at selected positions of the power piston B a conventional load limit abutment 43 of partial spiral form serves as a variable fulcrum for the lever 40, being usually set or adjusted as by a knob 44. The abutment 43 is capable of stopping servo motion at any point in either range, as for hand shutdown and servo-restricted starting. In normal operation it is adjusted to operate at the upper end of the oil range O of servo motion to suitably limit the maximum fuel oil delivery for safe engine operation, hence in the illustrated position of piston B the abutment is some distance above the lever 40.

The diaphragm connected rod 21 is shown operatingly associated with the load limiter lever 40 through a lever 45 and depending link or rod 46 the lower end of which is so located by diaphragm action as to provide a variably positionable fulcrum for the load limiter lever 40. The diaphragm-connected rod 21 bears downwardly on lever 45 through a pin 47 which, as illustrated, also connects the rod 21 to speed reset lever 22. Adjustment of the gas-pressure-responsive load limiter mechanism is shown in the form of a pivot pin 48 in a slot of lever 45 carried by a slide block 49 which can be adjusted by knob 50 to vary the effective length of the lever.

Link 45, pivot 48 and fulcrum rod 46 are arranged to provide a fulcrum for load limiter lever 40 as a result of gas pressure diaphragm motion to limit servo travel to approximately half its total stroke and to be out of fulcrum-forming position in the absence of gas pressure, thereby allowing total servo stroke except as limited by adjustable abutment 43. Adjustment of the pivot 48 (knob 50) is used to enable minor variations in the proportion of the total servo stroke to be devoted respectively to gas and oil greater or less than the approximate 1 to 1 ratio mentioned.

When the load is being carried by oil and gas (piston then in the oil range O and diaphragm 25 partly raised) the variable fulcrum afforded by gas-pressure-adjusted rod or link 46 remains in load limiting control and prevents overloading of the engine. In order for the engine to operate on both gas and oil, the gas valve G must be opened to its stop G" and at least partial gas pressure failure must have taken place. If at such time the gas pressure increases toward normal the increased pressure depresses the diaphragm 25 repositioning fulcrum rod 46, thus limiting servo movement in the fuel-on direction in the oil range to a value such that available gas plus limited oil will not overload the engine.

During rapid increases of load, resulting in a temporarily reduced speed, the governor normally, through servomotor movement, attempts to re-establish operating speed as rapidly as governor adjustment of the fuel supply will allow. To prevent temporary overloading of a dual fuel engine under such transient conditions, the gas-pressure-responsive adjustment of the fulcrum rod 46 prevents servo fuel adjustment in excess of that determined by current gas pressure.

To summarize the above arrangement and operation of the mechanism, in respect to load limiting, the same: (1) limits movement of the servo mechanism to the gas feeding range so long as the engine can carry its load on that fuel and determines when oil operation or partial oil operation can take place; (2) limits servo mechanism movement to the oil feeding range during partial gas failure and proportionally to the amount of failure; (3) causes servo mechanism movement in a direction out of the oil feeding range in event of complete or partial gas failure followed by complete or partial gas restoration and in proportion to the amount of restoration.

Fig. 2 shows a dual fuel engine control mechanism similar to Fig. 1 in that a single hydraulic relay governor is used to control the engine speed through a fuel metering servo mechanism and gas pressure-responsive means operated in conjunction with servo mechanism output motions to determine the maximum amount of fuel of either type which can be supplied to the engine, the governor also having provision for gas-pressure-conscious, speed reset operations when adjusted for permanent speed droop. Insofar as the mechanisms of Figs. 1 and 2 are operatively identical, the same characters are used for both, and the preceding description applies.

In Fig. 2 the governor speed-change-responsive mechanism, C, D, E, etc. causes movement of a fuel-metering servo mechanism in the form of separate servomotors BO (for oil) and BG (for gas) which, because of being separate, independently operating, units can be economically made with respectively different power capacities and strokes (whatever is best suited to the two types of fuel metering or feeding equipment used). The Fig. 2 arrangement also has certain advantages when "compensation" for isochronous operation is required, as will be explained. The plural servomotor type of system has a somewhat special advantage, in that no adjustment for the gas-function-responsive load limit control is needed. Proportioning of gas to oil ranges of fuel-regulating movement can be simply a matter of servomotor design.

Since in the Fig. 2 arrangement the gas and oil fuel metering operations are shared between two servomotors, it is necessary that each servomotor shall have engine-stabilizing feedback mechanism. When permanent speed droop is employed for that purpose and the servomotor assemblies are in proximity to each other, as shown, then assentially the same variable fulcrum mechanisms or devices of Fig. 1 can be used (shown in Fig. 2 at 55a and 55b). In that case a single speed droop adjuster slide 53 can carry the normally stationary pivots for both devices (shown in the form of a pin 57 on slide block 58). The devices 55a and 55b are operated by the respective servomotors BG and BO as through piston tailrods 65a and 65b as clearly shown. Links 61a and 61b of the speed droop mechanisms operate independently to vary the force of the speeder spring as by acting through an evener 52a pivoted as at 52b to the speeder lever 51.

Speed is initially set by manual adjusting device 53; and automatic resetting is through operation of a gas-pressure-responsive motor mechanism 70 corresponding to motor 20 of Fig. 1. Mechanism 70 has an adjustable linkage connecting with the speeder lever, operatively the same as in Fig. 1, including lever 72 and output rod 73. Rod 73 and manual speed setting device 53 act independently of each other on the floating lever arm portion 54 through a pivoted "evener"

link assembly 56. In the described arrangement, some of the floating lever and linkage connections should be universally acting pivots (not illustrated, being well understood in the art).

For dual fuel control, the separate servomotors of the Fig. 2 arrangement cannot operate independently of each other. Valve mechanism 80 (to be explained later) is provided which operates, in effect, as a double acting latch or interlock to prevent movement of the piston of oil-metering servomotor BO from movement out of pilot-oil-serving position until the gas piston of servomotor BG has moved to its full-fuel position and, conversely, to prevent subsequent movement of the BG piston out of full-fuel position when the BO piston starts to move out of its pilot oil position and until the BO piston has returned to pilot position.

Assuming such interlocked, sequential servo mechanism action as just outlined it will be apparent that, to carry operating load, the speed droop mechanism 55a will determine the deviation in speed setting for stabilization from no-load through full-load on gas. When gas pressure in motor 70 falls to the predeterminal minimum (then calling for conversion to operation solely on oil) the gas-function-responsive speed resetting operation through mechanism 70, 72, and 73 offsets the readjustment of speed setting by speed droop mechanism 55a which is essentially the same operation as described in connection with Fig. 1. It follows that gas-function-responsive speed resetting by motor 70, in event of partial gas failure, calling for concurent gas and oil operation, is also automatically provided for, the same as in the case of Fig. 1.

The servo-piston-interlocking valve mechanism 80 as shown, comprises a plunger 81 in a suitable valve chamber, the plunger being operated as by piston-tail-rod-connected lever 82 so as to be positioned by sequential operation of the BG and BO pistons to route governor regulating fluid as from line R' alternately to the larger piston area sides of the BG and BO pistons, the governor pilot valve however remaining in full control of regulating fluid.

Middle land 81a of the interlock valve plunger 81 is initially positioned (both servo pistons down) to enable control of regulating fluid with respect to the BG piston only through line 83. Movement of the BG piston to the illustrated full-fuel position cuts off regulating fluid communication between R' and line 83 through land 81a, and, concurrently, by movement of top land 81b into unblocking relationship to port 84, introduces constant pressure governor fluid through line 83 to below the BG piston to lock that piston in said position. As the middle land 81a blocks regulating fluid passage R' to the BG servo line 83, it opens said passage to regulating fluid line 85 which leads through the chamber of automatic load limit valve T' to the regulating fluid space (lower chamber) of the oil regulating servomotor BO. Full governor control is assured by the fact that middle land 81a never completely blocks the regulating fluid passages of both servomotors at the same time.

When both servomotor pistons are in their lowermost positions, the regulating fluid line 85 leading to the BO servomotor is vented to sump at S" by action of lower land 81c of valve plunger 81. Thereby seepage of constant pressure governor fluid from the upper chamber of the BO servomotor into the lower chamber cannot lift the piston.

By virtue of the latch or interlock mechanism above described (assuming initial engine operation wholly on gas except for pilot oil action) it will be clear that until such time as the gas fails to carry an operating load with the gas admitting valve at maximum open position, the governor meters the gas fuel supply as though the oil metering mechanism were not a part of the system. After such gas failure takes place, conversion exclusively to oil fuel operation follows automatically as was the case in the Fig. 1 arrangement. Thereupon load limiting becomes a combined function of (e. g.) gas pressure and oil-metering piston position, the load limiting operation acting only on the oil metering portion of the servo mechanism (servomotor BO in this case) essentially as with the Fig. 1 arrangement. In event of a partial restoration of gas, after sufficiently complete gas failure to permit functioning of the interlock mechanism 80, the oil-metering servo piston BO is caused to move in the fuel-off direction to an extent proportional to the amount of gas restoration (with the oil still carrying all of the load) and then, if the gas becomes fully restored, the oil metering servo piston goes to its initial or pilot position, removing the gas metering servo piston from influence of interlock mechanism 80 and again putting the engine fully under governor control on gas alone.

The load limiting in the particular arrangement shown by Fig. 2 is accomplished by operation of the BO piston tailrod 65b on a floating lever 86 connected to the plunger 87 of load limit valve T'. The valve T' is moved to spill regulating fluid from the larger piston area of servomotor BO at variable points in its fuel-on stroke as determined by gas pressure in a diaphragm motor 70a having its output rod 71a arranged to provide a variable fulcrum for lever 86.

Diaphragm motors 70 and 70a, incidentally, could be replaced by a single pressure-responsive motor of the same type acting through an "evener" (not shown) on speed re-set link element 72 and load limiter lever 86. Adjustment for the gas-function-responsive load limiting mechanism, (see 48—50, Fig. 1) is not actually needed (feature included in the design of the BG servomotor) and is omitted from Fig. 2 to minimize complexity of illustration.

Provision of a single governor with separate servomotors, one for each fuel as in Fig. 2 (and with assumed special work capacities and stroke lengths as may be desired in order to avoid re-design of existing fuel feeding linkage) tends to simplify the problem of providing ideal compensating action in the governor for isochronous operation. Different compensation fluid pumping rates appropriate for mating the two types of linkage are readily attainable by proper design of the respective displacement mechanisms.

Figure 7:
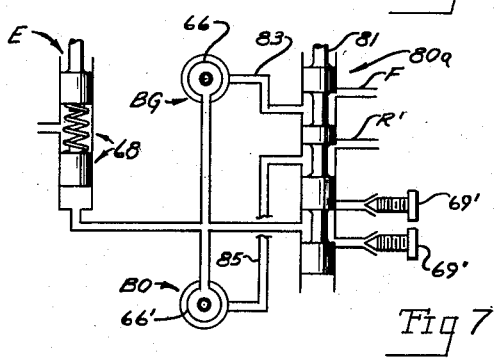
Fig. 7 is a schematic diagram showing a modified temporary speed droop or compensation system for use with a plural servo piston arrangement such as shown by Figs. 2 and 3.

Fig. 2 shows actuating displacement pumps 66 and 66' of servomotors BG and BO connected to a common compensation fluid duct 67 leading to a pilot-valve-coupled, receiving compensation piston assembly 68 operatively identical with that shown in the Kalin patent. A single leak-off adjustment needle for the compensation system is shown at 69. If different compensation fluid leak-off rates for the gas and oil operation are required, as by reason of having a significant difference in compensation fluid pumping rate for the respective fuels, then separate leak-off points, as suggested by valves 69' and 69" Fig. 7, can be rendered effective exclusively for each. For example a portion of the interlock or servosequence-determining valve 80a or its equivalent may be devoted to routing compensation fluid to one adjustable leak-off metering needle (69') while servo piston BG is in operation and to another needle (69'') while servo piston BO is in operation.

Figs. 3 and 4 are included principally by way of illustration of a dual fuel engine control and governing system generally the same in operation as that of Fig. 2 (one governor with separate servomotors), but wherein the two servomotor units can be more easily located remotely of the speed-setting and speed-change-responsive portions of the governor and remotely of each other by reason of more extensive use of fluid operated apparatus.

The gas servo BG' is shown in Fig. 3 at the top of its stroke, that being illustrative of the condition obtaining for example at the instant when the gas has failed, the oil servo BO' being still in pilot-oil-serving position. As an interlocking means for sequential operation of the servomotors BG' and BO', valves 90 and 91 are used which are associated with and mechanically operated by the respective servomotors. The relatively smaller sides of both servo pistons are continually supplied with constant pressure fluid as before through line P. Regulating fluid (line R) at commencement of engine operation (same as at the end of gas operation, as illustrated), on gas, is connected to the BG' piston through the interlock valve 91, a lower land 91a of which has opened port 92 of the valve to regulator line portion 93 of the BG' servomotor. The valve-port-opening movement may have resulted from previous fuel-off movement of the BO' piston to its pilot oil position in which the piston depressed the plunger of the valve 91 as will be apparent. At the top limit of the stroke of the BG' piston the latter, as shown, opens port 94 of the interlock valve 90 which port theretofore was blocked by valve land 95 (immobilizing the BO' piston) so that, in the illustrated relationship of parts, the BO' servomotor is placed under governor control (conversion completed). Regulating fluid (line R) is routed to the BO' servomotor through line 96 which passes through the load limit valve T'. Load limiting, as in Fig. 2, is under conjoint control of diaphragm motor 70a and the BO' servomotor. As the BO' servo piston moves in its fuel-on direction, the spring of valve 91 closes regulating fluid port 92 and opens the regulating fluid (lower) chamber of gas servo BG' to constant pressure fluid by unclosing port 97, thus locking the gas servo piston in full-fuel position until the BO' piston returns to its pilot oil position.

The speed setting mechanism (lever 51 and associated parts) is similar to that of Fig. 2 (unmodified parts being similarly indicated). The end portion 52 of lever 51 has its evener portion 52a adapted, as by provision of spherical projections 52' for example, for co-operation with fluid-operated speed droop mechanisms 100 and 101. Those mechanisms and the co-operating means to actuate them (pressure device 102 for the BG' piston and 103 for the BO' piston) in accordance with servo piston movement or position are operatively identical, hence only one complete mechanism (e. g. 101, 102) will be described.

Referring further to Figs. 3 and 4, the pressure device 102 (left Fig. 3) functions to maintain hydraulic fluid (from constant pressure source F) at varying pressure in a line 105 leading to a receiver chamber 106. Chamber 106 contains a piston 107 connected for operating governor speed-setting-modifier device 108. Device 108, Fig. 4, is shown in the form of a cam with an inclined slot 108' embracing its speeder arm projection 52'.

Movement of the piston 107 in the direction to slack off on the governor speeder spring (leftward movement as shown) is resisted by a spring assembly 109 which includes spring 110 and an adjusting piece 111 for changing the force of the spring. The piston 107 and its cam are arranged (for zero speed droop) to be blocked against movement as by a pin 112 which can be moved by adjuster piece 111 in a manner to shunt the spring out of action.

The actuator 102 by which speed droop mechanism 101 is operated as a function of BG' servo piston position is shown in the form of a regulator device including a spool-like piston-valve 115 and a spring 116 interposed between it and the servo piston. The upper land 117 of the piston-valve 115 normally closes port 120 which is shown connected to constant pressure supply line F. Lower land 118 normally closes a vent port 121. The space 119 between the two lands continually communicates with line 105 leading to receiving piston chamber 106. The pressure in line 105 is varied in accordance with servo piston position and is maintained, regardless of leakage, either by replenishment from port 120 or by spill at port 121. Thus receiving piston 107 operating in conjunction with speed droop adjusting spring 110 provides a given position for cam 108 for each BG' servo piston position except when the spring 110 is shunted out of action for zero speed droop.

Actuator 103 and cam 108 of the BO' servomotor speed droop mechanism (right and top Fig. 3) further illustrate the above described modifying action on the governor speed setting means. There the spring 116 is shown relieved to a point that will permit the associated cam 108 to be moved by its spring 110 to initial fulcrum-establishing position preparatory to adjusting speed by manual device 53.

Figure 5:
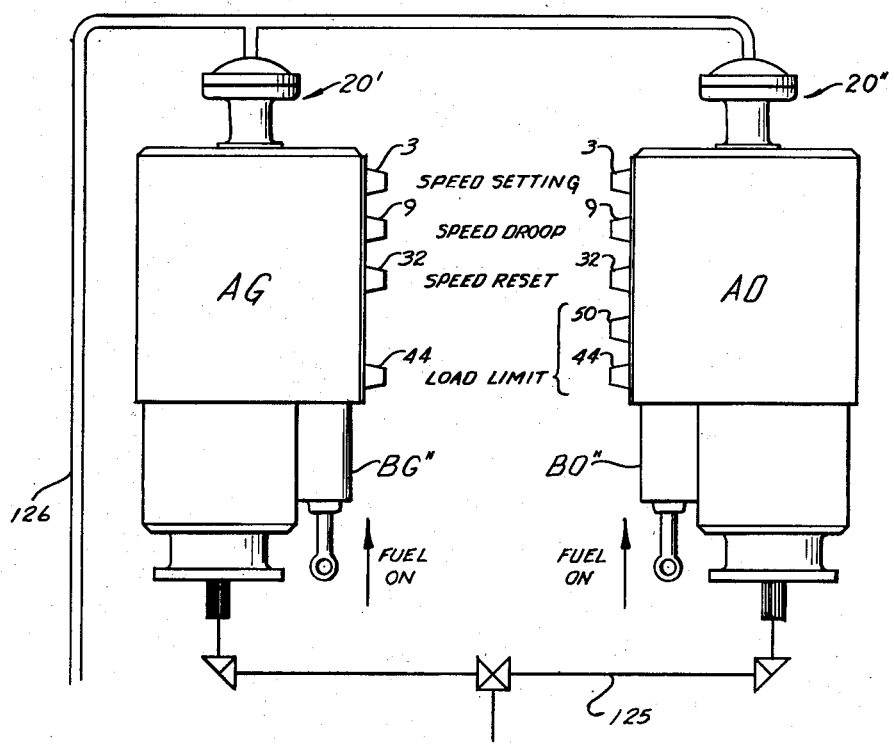
Fig. 5 shows a dual fuel governor system including two hydraulic relay governors each having a fuel metering servo piston, one for gas and one for oil.

Referring to the dual fuel control system as shown in Fig. 5, the governor units AG and AO, basically, are, for example, essentially identical hydraulic relay governors such as shown at A schematically in Fig. 1. Governor AG with servomotor BG'' is assumed to be especially adapted and designed for gas feeding operation and governor AO (servo BO'') for oil feeding. The governors may have a common drive connection 125 to the engine and they need to differ only in the selection and provision of specific auxiliary apparatus such as fully shown in Fig. 1.

As represented in Fig. 5 solely by the adjusting knobs, the gas-metering governor AG is equipped with means for speed setting (knob 3), adjustment for the amount of speed droop (knob 9) and adjustment for gas-function-responsive speed reset (knob 32). Similarly, the oil metering governor AO has the same three mechanisms as just mentioned plus the gas-function-responsive load limiting mechanism represented by knob 50. Both governors, additionally, have the hand adjusted load limiter, see knob 44, which serve as adjustable maximum fuel stops and for hand shutdown of each unit.

In the Fig. 5 arrangement proper sequence of servo action is assured by initially setting the speed of the oil governor differently and in the proper direction from the speed setting of the gas governor by the amount of speed droop at which the gas governor is adjusted for full range operation and by giving the oil governor the same speed droop adjustment or setting.

Suppose for example governor AG is set for 950 R. P. M. engine operation and 50 R. P. M. speed droop, then governor AO is set for 900 R. P. M. and 50 R. P. M. speed droop. Thereby, as in the previously described arrangements, in event of a complete gas failure at full operating load (servomotor BG″ then at full fuel) the speed setting of gas governor AG is automatically reset through action of diaphragm motor 20′ at 950 R. P. M. (offsetting the departure by action of the speed droop mechanism). That, in ordinary service, insures that the BG″ servomotor will remain at its full fuel position during any subsequent movement of the BO″ servomotor and until it has returned to its pilot oil position. Since the AO governor speed will have been reset to 950 R. P. M. by diaphragm motor 20″ and the rest, the same operating load is carried on oil at 900 R. P. M. through action of the AO governor speed droop mechanism. In like manner, for partial gas failures, pressure responsive resetting of speed of both governors insures that the load being carried prior to the failure will be carried after the failure at the same engine speed regardless of the amount of the operating load.

Since automatic load limit adjustment as a function of gas pressure acts only on the servomotor of the AO governor it will be apparent that the load limiter action will be the same as described in connection with Fig. 2.

Figure 6:
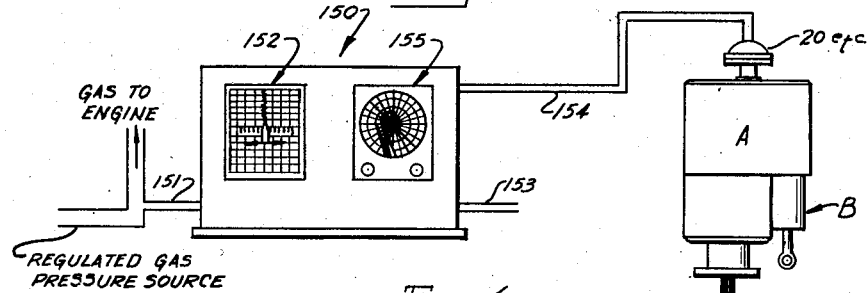
Fig. 6 is a diagram showing a known type of mechanism for enabling speed resetting and load limit adjustment through the agency of a gas potentiality factor other than gas pressure.

By way of illustration of an apparatus by which the various load limting and speed resetting mechanisms described above can be made responsive to a gas potentiality factor other than gas pressure, a form of gas-calorimeter-connected air pressure controller 150 is shown more or less conventionally in Fig. 6.

The regulated gas pressure source for operating the engine (all as indicated) is tapped as at 151 and a small portion of the gas is diverted into the control box for testing of B. t. u. content and recording by instrument 152. Instrument 155 of unit 150 controls air output pressure in accordance with the air pressure control setting. Air pressure supply is introduced into the control box at 153 and pressure controlled output air, through line 154 leads to the pressure sensitive motor device or devices 20, 20′, 20″, 70, 70a, etc.

By interconnection of instrument 152 and 155 the control point of 155 is varied to correspond with the measured B. t. u. gas content and the air pressure in line 154 is therefore varied as a function of B. t. u. content. Thus speed resetting and load adjustment will be made in accordance with fluctuations of B. t. u. content of the pressure-regulated gas supply and also in event of a failure of the gas supply pressure.

An "engine-operating-capability characteristic" of an engine fuel, as that expression is used in the claims hereof, means any characteristic of the fuel which may be variable and which for a given value of that characteristic, all other engine affecting variables being fixed, determines the load which the engine is capable of carrying.

I claim:

1. Speed governor mechanism for dual fuel internal combustion engines operative on first and second fuels, the mechanism having speed setting means and speed-change-responsive, fuel-metering means operating in accordance with set speed to vary the rates of feeding of said fuels to the engine under predetermined loads, the speed setting means including means to progressively modify the speed setting according to the position of the fuel metering means, hence the load, and first-fuel-failure-responsive means connected to a portion of the speed setting means and operating therethrough to increase the set speed in consequence of reduction in the effectiveness of the first fuel to operate the engine at a predetermined speed under a predetermined load.

2. Speed governor mechanism for dual fuel internal combustion engines operative on gaseous and liquid fuels, the mechanism having speed setting means and speed-change-responsive, fuel-metering means operating in accordance with set speed to vary the rates of feeding of said fuels to the engine under predetermined loads, the speed setting means including means to progressively modify the speed setting according to the position of the fuel-metering means, hence the load, and gaseous-fuel-failure-responsive means connected to a portion of the speed setting means and operating therethrough to increase the set speed in consequence of reduction in the effectiveness of the gaseous fuel to operate the engine at a predetermined speed under a predetermined load.

3. A speed governor mechanism for an internal combustion engine arranged to operate on liquid and gaseous fuels, the governor mechanism being arranged for operation with permanent speed droop and having speed setting means and a servo mechanism including two fuel-metering servomotors with means connecting the servomotors to feeding devices of the respective fuels and means to restrain the oil fuel metering servomotor from movement until the gaseous fuel metering servomotor has moved to full fuel position, and mechanism responsive to variations in an engine-operating-capability-characteristic of the gaseous fuel and connected with the speed setting means for increasing and decreasing the set speed in consequence of reduction and increase respectively in the effectiveness of the gaseous fuel to operate the engine.

4. A speed governor mechanism for an internal combustion engine arranged to operate on liquid and gaseous fuels, the governor mechanism having speed setting means and connected speed-change-responsive fuel-metering servomechanism operative to vary the rates of feeding of said fuels to the engine, mechanism connected for operation on the speed setting means by the servo mechanism to decrease the speed setting progressively as a function of increasing engine load as reflected by servo mechanism position, and other mechanism responsive to variations in an engine-operating-capability-characteristic of the gaseous fuel and operatingly connected with the speed setting means for increasing the set speed by an amount such as will approximately cancel the progressive decrease as the effectiveness of the gaseous fuel to operate the engine diminishes.

5. A control system for internal combustion engines adapted to operate on two fuels, said system comprising speed setting means and speed-change-responsive servo mechanism connected therewith, means arranged to cause the servo mechanism to feed the two fuels one after the other and means connecting the servo mechanism and speed setting means for permanent speed droop operation, load limiting means for limiting the servo mechanism movement during its second-fuel-feeding action and partly as a function of second-fuel-feeding movement, and first-fuel-failure responsive means connected to the speed setting means in a manner to cancel or offset the speed droop of the servo mechanism under predetermined load and connected to the load limiting means in a manner to vary the point at which that means becomes effective.

6. A control system for engines adapted to operate on two fuels, said system comprising speed-change-responsive servo means arranged for metering the first and second employed fuels, mechanism capable of acting on the servo means during its movement in a direction to increase the second employed fuel and partly as a function of that movement for limiting the movement, said mechanism including first-fuel-failure-responsive means automatically adjusting the point in said movement at which the limiting operation becomes effective and in such direction that the permitted movement is approximately proportional to the amount of failure.

7. A control system for dual fuel engines adapted to operate on oil and gas, said system comprising speed-change-responsive servomotor means arranged for metering the respective fuels, mechanism acting on the servomotor means during its oil-fuel-increasing movement and partly as a function of that movement for limiting the same, said mechanism including variably acting gas-failure-responsive means and a member positioned thereby in a manner to block the movement of a portion of said mechanism in different positions, whereby to allow oil feed increase approximately in proportion to the amount of gas failure.

8. In a governor mechanism for dual fuel engines adapted to operate on oil and gas, said mechanism comprising a speed-change-responsive servo including motor means connected for metering the two fuels, load limiting mechanism including a floating lever capable of controlling power input to the motor means during its oil-fuel-increasing movement and partly as a function of that movement for limiting the movement, said load-limiting mechanism including gas-failure-responsive means connected to and acting through a variable fulcrum of the floating lever whereby to adjust the point in said movement at which the load-limiting operation becomes effective.

9. In a governor mechanism for dual fuel engines adapted to operate on oil and gas, said governor mechanism comprising speed-change-responsive servo mechanism including motor means connected for metering the two fuels, load-limiting mechanism capable of acting on the motor means during its oil-fuel-increasing movement and partly as a function of that movement for limiting the movement, said load limiting mechanism including a pressure-responsive, motor device arranged for operation as a function of gas failure and restoration and arranged automatically to adjust the point in said movement at which the load-limiting operation becomes effective.

10. A speed governor for dual fuel engines adapted to operate on oil and gas fuels and having separate fuel feeding or admitting means for each, the governor comprising a single fuel metering servomotor operating in response to engine speed change, means connecting the servo motor to the separate fuel feeding or admitting means, load limiting mechanism for arresting the servomotor in its oil-fuel-increasing direction of movement, said load limiting mechanism including means responsive to a variable characteristic of the gas fuel which affects its ability to operate the engine, said last mentioned means being connected for operation through the load limiting mechanism to render it effective farther from the point of commencement of its oil-fuel-increasing movement as the ability of the gas fuel to operate the engine diminishes, whereby to restrain utilization of oil in carrying a predetermined load so long as the engine is capable of carrying that load on available gas.

11. A governor mechanism for dual fuel engines adapted to operate on oil and gas, comprising a speed-change-responsive servo mechanism including two power pistons, respectively arranged for metering the oil and gas fuels, load limiting mechanism capable of acting on the oil-fuel-metering piston during its fuel-increasing movement and partly as a function of that movement, the load limiting mechanism including means responsive to fluctuation of a variable characteristic of the gas fuel which affects its ability to operate the engine, said means automatically modifying the load limiting mechanism action to the extent of rendering it effective farther from the point of commencement of said oil metering piston movement as the ability of the gas fuel diminishes.

12. A governor for dual fuel engines adapted to operate on oil and gas, comprising a speed-change-responsive servo mechanism including two power pistons respectively arranged for metering the oil and gas fuels, means interlocking the pistons in such manner that the oil-metering piston cannot move in its fuel-on direction until the gas-metering piston has moved a predeterminal distance in its fuel-on direction, load limiting mechanism capable of acting on the oil-metering piston during its fuel increasing movement and partly as a function of that movement, the load limiting mechanism including means responsive to variations in a characteristic of the gas fuel which affects its ability to operate the engine, said gas-variation-responsive means automatically modifying the load limiting mechanism action to the extent of rendering it effective farther from the point of commencement of said oil metering piston movement as the ability of the gas fuel diminishes.

13. A dual fuel engine control system employing two hydraulic relay speed governors, each with speed setting means acting through a respective speed-change-responsive relay input element to operate the associated relay output element connected to feed a respective fuel, and each governor having an adjustable permanent feedback or speed droop mechanism acting on its speed setting means, whereby the governors, through relatively higher speed setting of the first acting governor, can be set for control of the engine exclusively on the first acting fuel so long as that fuel remains available to the engine in sufficient quantity to carry a required load at a required speed, characterized particularly by provision of mechanism which is responsive to varying degrees of failure on part of the first fuel and which mechanism is connected to act on the speed setting means of both governors by an amount such as will offset or cancel the speed droop action of the first acting governor, so that fuel feeding by the second acting governor is restrained to commence at an engine speed which is higher than the commencing speed setting of the second acting governor by approximately the amount that engine speed declines as a result of first-acting-fuel-failure and imposed load.

14. A dual fuel engine control system employing two hydraulic relay speed governors, each with speed setting means acting through a respective speed-change-responsive relay input element to operate the associated relay output element connected to feed a respective fuel, and each governor having an adjustable permanent type feedback or speed droop mechanism acting on its speed setting means, whereby the governors, through relatively higher speed setting of the first acting governor, can be set for control of the engine exclusively on the first acting fuel so long as that fuel remains available to the engine in sufficient quantity to carry a required load at a required speed, characterized particularly by provision of mechanism which is responsive to varying degrees of failure on part of the first fuel and which mechanism is connected to act on the speed setting means of both governors by an amount such as will offset or cancel the speed droop action of the first acting governor, so that fuel feeding by the second acting governor is restrained to commence at an engine speed which is higher than the commencing speed setting of the second acting governor in proportion to the engine speed declination resulting from first-acting-fuel-failure under the required load, and so that complete or partial first-fuel-restoration will cause proportional discontinuance of second fuel feeding.

15. A hydraulic governor for dual fuel internal combustion engines, comprising a servo mechanism including a single speed responsive means connected to control fuel metering operation of two separate hydraulic motors, one for each fuel, means interconnecting the motors in a manner to cause them to operate sequentially a hydraulically acting temporary speed droop or compensation system comprising fluid forcing devices connected for operation by respective motors, fluid force receiving means operatively arranged to transmit the fluid output of said devices to the speed responsive means, passage means connecting the devices to the fluid force receiving means, and adjustable restricted orifice means connected with the passage means for inlet and outlet of fluid with respect thereto.

16. The governor according to claim 15, wherein the fluid passage means has two branch portions each with an individually adjustable restricted orifice means and valve means, connected for operation by the means which causes the motors to operate sequentially, the valve means being arranged interchangeably to open one branch portion and close the other to communication with the passage means generally.

17. In an engine speed governor, a servo mechanism comprising speed responsive means and a governor output motor member controlled thereby for metering engine fuel, speed setting means for the speed responsive means, and a hydraulic mechanism connected between the motor member and speed setting means for causing progressive modification of speed setting according to load, said hydraulic mechanism including a substantially constant pressure fluid source, pressure regulator valve means connected for operation by said motor member to vary pressure of fluid from said source in a suitable passage in accordance with positions of the motor member, and motor means connected to the passage and having a motor means output connection to the speed setting means.

18. In a hydraulic relay speed governor having speed-change-responsive means controlling a governor output motor member and speed setting means acting on the first means; a speed setting modifier comprising a piston-valve arranged to operate as a pressure regulator, the piston valve being connected for operation by the motor member through a spring to maintain pressure in a conduit which pressure varies with motor member movement, a fluid operated motor device connected for movement in one direction by the pressure maintained in the conduit, a spring opposing said movement of the device by pressure fluid in the conduit and means operatingly connecting said device to the speed setting means to cause progressive resetting of speed in accordance with motor member position.

19. The mechanism according to claim 18 including means for adjusting the effective force of the second mentioned spring and means for rendering that spring ineffectual.

20. A speed governor for an internal combustion engine which is capable of operating to carry load, at least part of the time, solely on gaseous fuel, the governor having speed-change-responsive mechanism including fuel metering means adapted for connection with a gas throttle, and speed setting means a portion of which is connected to the metering means for automatic modification of speed setting according to engine load, characterized by provision of engine-gas-supply-failure-responsive motor means connected to the speed setting means and acting thereon, as a consequence of such failure, to countermodify the speed setting.

21. A control system for engines adapted to operate on two fuels, said system comprising speed-change-responsive servo means arranged for metering the first and second employed fuels, an abutment arranged for operative connection with the servo means to limit its fuel increasing movement, abutment adjusting means arranged for operation as a function of deviation from a predetermined value of an engine operating characteristic of the first employed fuel, said adjusting means thereby operating automatically to adjust the point in said fuel increasing movement at which the abutment is rendered operative and in a direction tending to maintain an approximately constant maximum engine operating load limit irrespective of the amount of first fuel deviation.

22. Speed governor mechanism for internal combustion engines adapted to operate on two fuels having different metering characteristics, the mechanism having speed change responsive means and fuel metering motor means controlled thereby and operating to vary the rates of feeding of such two fuels to the engine, permanent speed modifying means operatingly interconnected between the motor means and the speed change responsive means, and speed countermodifying means responsive to deviation from a predetermined value of an engine operating characteristic of one of the fuels and being connected for automatic action on the speed responsive means in event of occurrence of such deviation.

23. A speed governor for an internal combustion engine which is capable of operating to carry a predetermined load at a predetermined speed solely on gaseous fuel, the governor having speed-change-responsive mechanism including a fuel metering motor having an output member adapted for connection with a gas throttle, the speed-change-responsive means having a portion which is connected to the motor output member in a manner to effect automatic modification of engine speed according to positions of said output member, characterized by provision of engine-gas-supply-pressure-deviation-responsive motor means connected to the speed-change-responsive mechanism, and acting thereon as a consequence of such deviation, to countermodify the engine speed.

References Cited in the file of this patent

UNITED STATES PATENTS

| Number | Name | Date |
|---|---|---|
| 2,489,405 | Doyle | Nov. 29, 1949 |
| 2,518,400 | Thompson | Aug. 8, 1950 |